(12) United States Patent
Tezuka et al.

(10) Patent No.: US 8,904,804 B2
(45) Date of Patent: Dec. 9, 2014

(54) OVERSPEED PROTECTION APPARATUS FOR GAS TURBINE ENGINE

(75) Inventors: Makoto Tezuka, Wako (JP); Koji Fukutomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1089 days.

(21) Appl. No.: 12/861,300

(22) Filed: Aug. 23, 2010

(65) Prior Publication Data

US 2011/0041512 A1 Feb. 24, 2011

(30) Foreign Application Priority Data

Aug. 24, 2009 (JP) ................................. 2009-192932

(51) Int. Cl.
  *F02C 9/46* (2006.01)
  *F02C 9/00* (2006.01)
  *F02G 3/00* (2006.01)
  *F02C 9/28* (2006.01)

(52) U.S. Cl.
  CPC ............ *F02C 9/28* (2013.01); *F05D 2270/021* (2013.01); *F05D 2270/3013* (2013.01)
  USPC ..................... 60/779; 60/39.281; 60/39.091

(58) Field of Classification Search
  CPC .............. F02C 7/232; F02C 9/16; F02C 9/26; F02C 9/263; F02C 9/28; F02C 9/32; F02C 9/38; F02C 9/46; F05D 2270/021; F05D 2270/09; F05D 2270/094
  USPC ................ 60/39.01, 39.094, 39.13, 779, 790, 60/39.091, 39.25, 39.281
  See application file for complete search history.

(56) References Cited

U.S. PATENT DOCUMENTS

| 3,023,575 | A | * | 3/1962 | McCombs, Jr. et al. | ......... 60/790 |
| 4,716,531 | A | * | 12/1987 | Saunders et al. | .............. 701/100 |
| 5,369,948 | A | * | 12/1994 | Vertens et al. | .................. 60/778 |
| 6,655,126 | B2 | * | 12/2003 | Walker et al. | ................... 60/243 |
| 7,840,336 | B2 | * | 11/2010 | Muramatsu et al. | .......... 701/114 |
| 8,000,854 | B2 | * | 8/2011 | Majka | ........................... 701/457 |

(Continued)

FOREIGN PATENT DOCUMENTS

| JP | 58-057098 | 4/1983 |
| JP | 63-147932 | 6/1988 |

(Continued)

OTHER PUBLICATIONS

Japanese Decision to Grant a Patent and partial English translation, Application No. JP 2009-192932, dated Aug. 14, 2013, 4 pages.

*Primary Examiner* — Phutthiwat Wongwian
*Assistant Examiner* — Arun Goyal
(74) *Attorney, Agent, or Firm* — Rankin, Hill & Clark LLP

(57) ABSTRACT

In an overspeed protection apparatus for a gas turbine engine having a turbine rotated by combustion gas injected from a combustion chamber to drive a compressor, a fuel shutoff valve to shut off fuel to be supplied to the engine and a controller controlling operation of the fuel shutoff valve based on a turbine rotational speed to protect the turbine from overspeed, an outlet pressure of the compressor is detected and compared with a threshold value when a shutoff command is outputted, and the fuel shutoff valve is determined to be failed when the detected pressure is not less than the threshold value, thereby enabling to promptly detect the fuel shutoff valve failure without additional installing sensor, thereby enhancing the reliability.

9 Claims, 3 Drawing Sheets

(56) References Cited

U.S. PATENT DOCUMENTS

| | | | |
|---|---|---|---|
| 8,297,036 B2 * | 10/2012 | Vanderleest et al. | 60/39.091 |
| 2005/0109038 A1 * | 5/2005 | Matthews | 60/779 |
| 2008/0163931 A1 | 7/2008 | Brocard et al. | |

FOREIGN PATENT DOCUMENTS

| | | |
|---|---|---|
| JP | 01-159425 | 6/1989 |
| JP | 01-219322 | 9/1989 |
| JP | 02-169827 | 6/1990 |
| JP | 03-000932 | 1/1991 |
| JP | 07-21885 U | 5/1995 |
| JP | 08-128635 | 5/1996 |
| JP | 2001-090555 | 4/2001 |
| JP | 2006-063975 | 3/2006 |
| JP | 2006-316773 | 11/2006 |
| JP | 2008-530443 | 8/2008 |
| JP | 2008-291839 | 12/2008 |

* cited by examiner

OVERSPEED PROTECTION APPARATUS FOR GAS TURBINE ENGINE

BACKGROUND OF THE INVENTION

1. Field of the Invention

This invention relates to an overspeed protection (OSP) apparatus for an aeroplane gas turbine engine.

2. Description of the Related Art

In an overspeed protection apparatus for a gas turbine engine, a fuel supply line of the engine is interposed with a fuel shutoff valve (SOV) for shutting off or blocking the fuel supply to an engine combustion chamber when a detected turbine rotational speed exceeds a predetermined speed to stop combustion, thereby preventing overspeed of the engine turbine.

Specifically, an overspeed protection apparatus taught by Japanese Laid-Open Patent Application No. 2006-316773 is configured to have four CPUs that monitor the turbine rotational speed and, when two or more CPUs determine that the turbine rotational speed exceeds a predetermined speed, they discriminate that the engine is under overspeed condition and operate the shutoff valve to shut off the fuel supply to the combustion chamber. The configuration thus improves the reliability of the apparatus.

SUMMARY OF THE INVENTION

However, due to a mechanical failure of the fuel shutoff valve, e.g., valve sticking in opened/closed state, the reliability of the apparatus may sometimes be impaired. In particular, in the case where the valve is stuck open, even when the overspeed is detected, the fuel supply is not shut off so that the engine disadvantageously continues its overspeed operation. Electrical problem such as disconnection of a signal line has a similar possibility. However, in the above reference, the possibility of failure of the fuel shutoff valve is not taken into account.

The valve failure can be detected by a sensor that detects a valve opening position. However, additionally installing such a sensor makes the structure complicated.

An object of this invention is therefore to overcome the foregoing problems by providing an overspeed protection apparatus for a gas turbine engine which can promptly detect a failure of a fuel shutoff valve without additionally installing a sensor for the failure detection, thereby enhancing the reliability.

In order to achieve the object, this invention provides in its first aspect an apparatus for protecting overspeed of a gas turbine engine having a combustion chamber, a turbine rotated by combustion gas injected from the combustion chamber to drive a compressor, a fuel shutoff valve installed in a fuel supply line of the engine to shut off fuel to be supplied to the combustion chamber and a controller for controlling operation of the fuel shutoff valve based on a rotational speed of the turbine so as to protect the turbine from overspeed; comprising: a pressure sensor that detects pressure at an outlet of the compressor driven by the turbine; a comparator that compares the detected outlet pressure with a threshold value when a command of shutting off supply of the fuel is outputted; and a failure determiner that determines whether a failure of the fuel shutoff valve occurs based on a comparison result.

In order to achieve the object, this invention provides in its second a method if protecting overspeed of a gas turbine engine having a combustion chamber, a turbine rotated by combustion gas injected from the combustion chamber to drive a compressor, a fuel shutoff valve installed in a fuel supply line of the engine to shut off fuel to be supplied to the combustion chamber and a controller for controlling operation of the fuel shutoff valve based on a rotational speed of the turbine so as to protect the turbine from overspeed; comprising steps of: detecting pressure at an outlet of the compressor driven by the turbine; comparing the detected outlet pressure with a threshold value when a command of shutting off supply of the fuel is outputted; and determining whether a failure of the fuel shutoff valve occurs based on a comparison result.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

An overspeed protection apparatus for a gas turbine engine according to a preferred embodiment of the present invention will now be explained with reference to the attached drawings.

Figure 1:
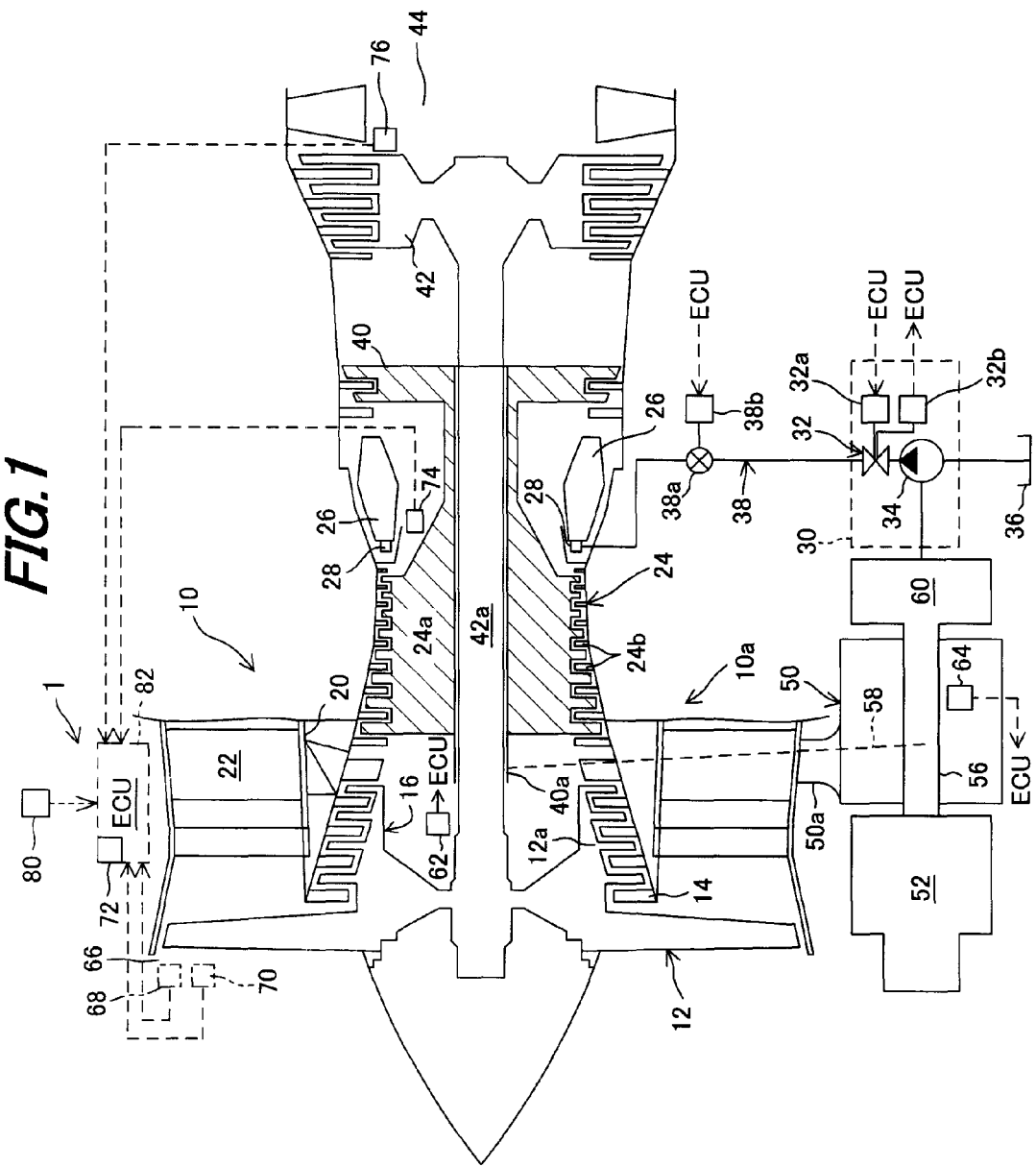
FIG. 1 is an overall schematic view of a gas turbine engine to which an overspeed protection apparatus for a gas turbine engine according to an embodiment of this invention is applied.

FIG. 1 is an overall schematic view of a gas turbine engine to which an overspeed protection apparatus for a gas turbine engine according to an embodiment of this invention is applied.

In FIG. 1, reference numeral 1 designates an overspeed protection (OSP) apparatus for a gas turbine engine according to this embodiment. The gas turbine engine is explained first for ease of understanding.

Four types of gas turbine engines, i.e., aeroplane gas turbine engines are commonly known: the turbojet engine, turbofan engine, turboprop engine and turboshaft engine. A two-shaft turbofan engine will be taken as an example in the following explanation.

In FIG. 1, reference numeral 10 designates a turbofan engine (gas turbine engine; hereinafter referred to as "engine"). Reference numeral 10a designates a main engine unit. The engine 10 is mounted at an appropriate location of an aircraft (airframe; not shown).

The engine 10 is equipped with a fan (fan blades) 12 that sucks in air while rotating rapidly. A rotor 12a is formed integrally with the fan 12. The rotor 12a and a stator 14 facing it together form a low-pressure compressor 16 that compresses the sucked-in air and pumps it rearward.

A duct or bypass 22 is formed in the vicinity of the fan 12 by a separator or splitter 20. Most of the air pulled in passes through the duct 22 to be jetted rearward of the engine 10 without being burned at a later stage (in the core). The force of the air accelerated rearward by the fan 12 produces a force of reaction that acts on the airframe (not shown), at which the engine 10 is mounted, as a propulsive force (thrust). Most of the propulsion is produced by the air flow from the fan.

The air compressed by the low-pressure compressor 16 flows rearward to a high-pressure compressor 24 where it is further compressed by a rotor 24a and stator 24b and then flows rearward to a combustion chamber 26.

The combustion chamber 26 is equipped with a fuel nozzle 28 that is supplied with pressurized fuel metered by an FCU (fuel control unit) 30. The FCU 30 is equipped with a fuel metering valve (FMV) 32. Fuel pumped by a fuel pump (gear pump) 34 from a fuel tank 36 located at an appropriate part of the airframe is metered or regulated by the fuel metering valve 32 and supplied to the fuel nozzle 28 through a fuel supply line 38.

The fuel metering valve 32 is connected to a torque motor 32a to be opened/closed thereby. Based on a command sent from an electronic control unit (ECU; explained later), the torque motor 32a operates the fuel metering valve 32 to open and close. The ECU outputs a command in accordance with a position of a thrust lever (not shown) manipulated by the pilot (operator). An opening sensor 32b is installed near the fuel metering valve 32 to detect the opening thereof. The fuel metering valve 32 is a normally closed type.

A fuel shutoff valve (SOV) 38a is interposed in the fuel supply line 38. The fuel shutoff valve 38a is connected to an electromagnetic solenoid 38b to be opened/closed thereby. Based on a command sent from the ECU, the solenoid 38b operates the fuel shutoff valve 38a to open and close. Specifically, when a shutoff command is outputted, the fuel shutoff valve 38a is closed to shut off the fuel supply to the fuel nozzle 28. The fuel shutoff valve 38a is a normally closed type.

The fuel nozzle 28 is supplied with compressed air from the high-pressure compressor 24 and sprays fuel supplied through the fuel supply line 38 using the compressed air. The fuel nozzle 28 comprises an air blast nozzle that uses solely compressed air to make fuel into spray.

The sprayed fuel from the fuel nozzle 28 is mixed with compressed air and the air-fuel mixture is burned after being ignited at engine starting by an ignition unit (not shown) having an exciter and a spark plug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a to drive the compressor 24.

After driving the high-pressure turbine 40, the hot high-pressure gas is sent to a low-pressure turbine 42 (after passing through the high-pressure turbine 40, the gas becomes lower in pressure than gas sprayed from the combustion chamber 26) to rotate it at relatively low speed. The low-pressure turbine 42 is connected to the rotor 12a of the low-pressure compressor 16 through a low-pressure turbine shaft 42a. The rotor 12a and fan 12 are therefore also rotated. The high-pressure turbine shaft 40a and the low-pressure turbine shaft 42a are provided in a dual concentric structure.

The turbine exhaust gas passing through the low-pressure turbine 42 is mixed with the fan exhaust air passing through the duct 22 without compression or combustion and the combined flow is jetted rearward of the engine 10 through a jet nozzle 44.

An accessory drive gearbox (hereinafter referred to as "gearbox") 50 is attached to the undersurface at the front end of the main engine unit 10a through a stay 50a. An integrated starter/generator (hereinafter called "starter") 52 is attached to the front of the gearbox 50. The FCU 30 is located at the rear of the gearbox 50.

When the engine 10 is started, a starter 52 is operated to rotate a shaft 56 and the rotation thereof is transmitted through a drive shaft 58 (and a gear mechanism including a bevel gear etc. (not shown)) to the high-pressure turbine shaft 40a to generate compressed air. The compressed air is supplied to the fuel nozzle 28, as mentioned above.

The rotation of the shaft 56 is also transmitted to a PMA (Permanent Magnet Alternator) 60 and the (high-pressure) fuel pump 34. The fuel pump 34 is therefore driven to pump and spray metered fuel from the fuel nozzle 28 as explained above. The resulting air-fuel mixture is ignited to start combustion.

When the engine 10 reaches self-sustaining operating speed, the rotation of the high-pressure turbine shaft 40a is transmitted back to the shaft 56 through the drive shaft 58 (and the gear mechanism including the bevel gear etc. (not shown)) to drive the fuel pump 34 and also drive the PMA 60 and starter 52. The PMA 60 therefore generates electricity and the starter 52 also generates electricity to be supplied to the airframe. When electric load on the airframe side is increased, power generated by the starter 52 is increased and rotational load of the high-pressure turbine shaft 40a is increased accordingly, thereby affecting the high-pressure turbine rotational speed, which will be explained later.

An N1 sensor (speed sensor) 62 is installed near the low-pressure turbine shaft 42a of the engine 10 and generates an output or signal proportional to the rotational speed of the low-pressure turbine (rotational speed of the low-pressure turbine shaft 42a) N1. An N2 sensor (speed sensor) 64 is installed near the shaft 56 and generates an output or signal proportional to the rotational speed of the high-pressure turbine (rotational speed of the high-pressure turbine shaft 40a) N2.

A T1 sensor (temperature sensor) 68 and P1 sensor (pressure sensor) 70 are installed near an air intake 66 at the front of the main engine unit 10a and generate outputs or signals proportional to the temperature (ambient temperature of the aircraft) T1 and the pressure P1, respectively, of the inflowing air at that location. A P0 sensor (pressure sensor) 72 is installed inside the ECU explained below and generates an output or signal proportional to atmospheric pressure P0. Further, a temperature sensor (not shown) is installed inside the ECU and generates an output or signal proportional to the temperature of the ECU.

Furthermore, a P3 sensor (pressure sensor) 74 is installed downstream of the rotor 24a and generates an output or signal proportional to the output pressure P3 (pressure at the outlet of the high-pressure compressor 24). An EGT sensor (temperature sensor) 76 is installed at an appropriate location downstream of the low-pressure turbine 42 and generates an output or signal proportional to the exhaust gas temperature EGT (low-pressure turbine outlet temperature). A WOW sensor (weight sensor) 80 is installed near a wheel of the airframe and produces an output or signal indicative of the weight acting on the wheel, i.e., indicating whether the aircraft is on ground.

The aforementioned ECU (now designated by reference numeral 82) is housed in the main engine unit 10a at its upper end. The outputs of the foregoing sensors indicating the operating condition of the engine 10 are sent to the ECU 82. The ECU 82 calculates a Mach number Mn indicating flight speed of the aircraft based on a ratio of the atmospheric pressure P0 to the pressure P1 and the flight altitude ALT based on the atmospheric pressure P0.

It should be noted that, among the foregoing sensors, some sensors are configured to be redundant for safety. Specifically, there are installed the two N1 sensors, four N2 sensors, two T1 sensors, eight EGT sensors, two P0 sensors, two P1 sensors (but no P1 sensor in the case where the signal of Mach number Mn is sent from the airframe side and based thereon, the pressure P1 is calculated), and two P3 sensors.

Further, based on the outputs of the sensors, the ECU 82 performs various types of engine control. One type of the engine control is protecting the engine 10 from overspeed based on the high-pressure turbine rotational speed N2. Specifically, when the high-pressure turbine rotational speed N2 is determined to exceed a predetermined speed, the ECU 82 controls the solenoid 38b to operate the fuel shutoff valve 38a to shut off the fuel supply to the fuel nozzle 28 (combustion chamber 26) so as to decrease the low-pressure turbine rotational speed N1 and high-pressure turbine rotational speed N2. Thus the overspeed protection apparatus 1 comprises at least the ECU 82, N2 sensor 64 and fuel shutoff valve 38a.

The ECU 82 also detects a failure of the fuel shutoff valve 38a. The explanation thereof will be made in the following.

Figure 2:
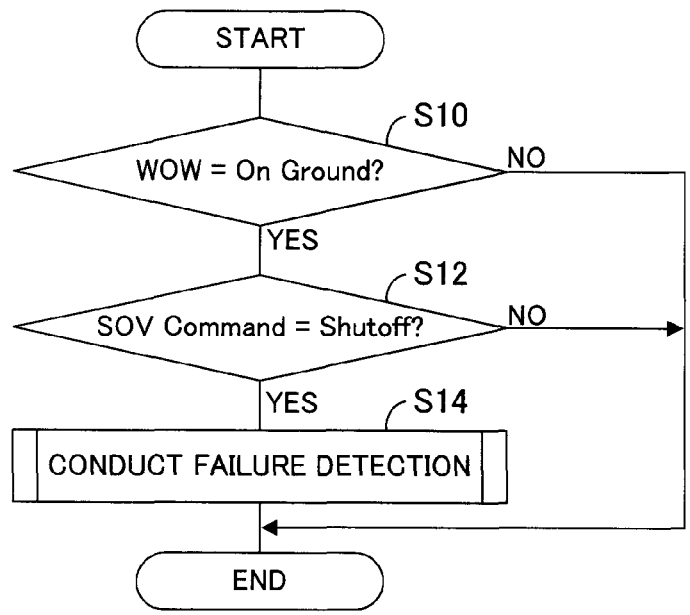
FIG. 2 is a flowchart showing the operation of the apparatus shown in FIG. 1.

FIG. 2 is a flowchart showing the failure detection of the shutoff valve 38a. This program is executed by the ECU 82 at predetermined regular intervals, e.g., 10 milliseconds.

The program begins at S10, in which it is determined based on the output of the WOW sensor 80 whether the aircraft is on ground. When the result is negative, the remaining steps are skipped and the program is terminated, since it is not preferable to conduct failure detection of the fuel shutoff valve 38a when the aircraft is not on ground (i.e., in flight).

When the result in S10 is affirmative, the program proceeds to S12, in which it is determined whether a shutoff command (SOV command) is outputted for the fuel shutoff valve 38a. The shutoff command for the fuel shutoff valve 38a is also outputted basically when the engine 10 experiences overspeed. In addition thereto, it is outputted when the failure detection of the fuel shutoff valve 38a is to be conducted upon activation of the ECU 82 or before the engine stop. When the result in S12 is negative, the remaining steps are skipped and the program is terminated.

When the result in S12 is affirmative, the program proceeds to S14, in which the failure detection of the fuel shutoff valve 38a is conducted.

Figure 3:
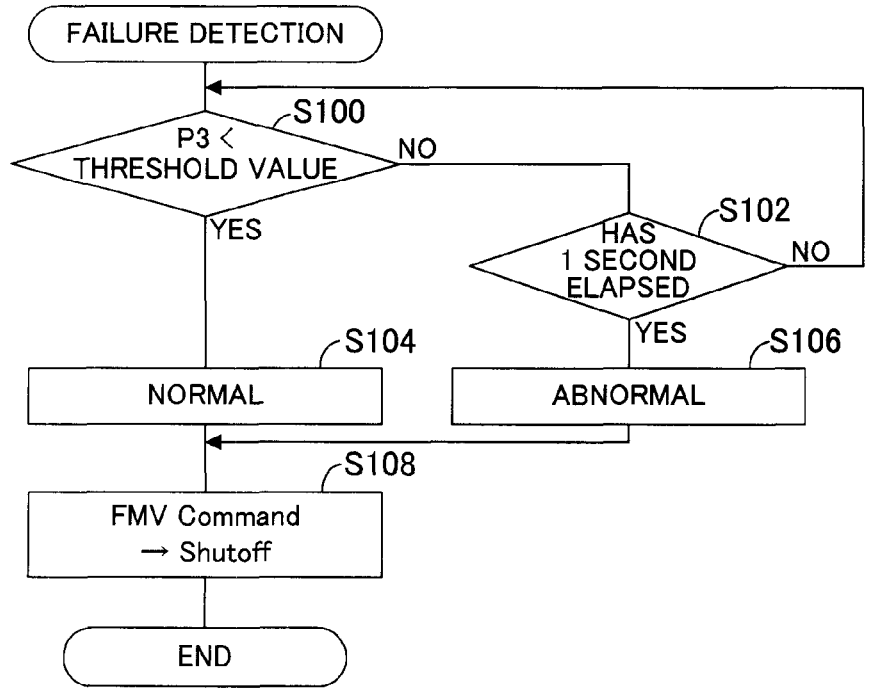
FIG. 3 is a subroutine flowchart showing a failure detection of FIG. 2.

FIG. 3 is a subroutine flowchart showing the failure detection of FIG. 2.

In S100, it is determined whether the outlet pressure P3 detected by the P3 sensor 74 is less than a threshold value set in advance. When the result is negative, the program proceeds to S102, in which it is determined whether one second has elapsed since the failure detection was started. When the result is negative, the program returns to S100.

When the result in S100 is affirmative, the program proceeds to S104, in which the fuel shutoff valve 38a is determined to be normal. When the result in S102 is affirmative, the program proceeds to S106, in which the fuel shutoff valve 38a is determined to be abnormal. Specifically, the fuel shutoff valve 38a is determined to be abnormal, i.e., a failure has occurred when the detected outlet pressure P3 is not less than the threshold value for a predetermined time period of one second since the command of shutting off supply of the fuel was outputted.

After normality/abnormality determination has been made, the program proceeds to S108, in which a shutoff command is outputted as a command (FMV command) for the fuel metering valve 32 to close the fuel metering valve 32 using the torque motor 32a.

Figure 4:
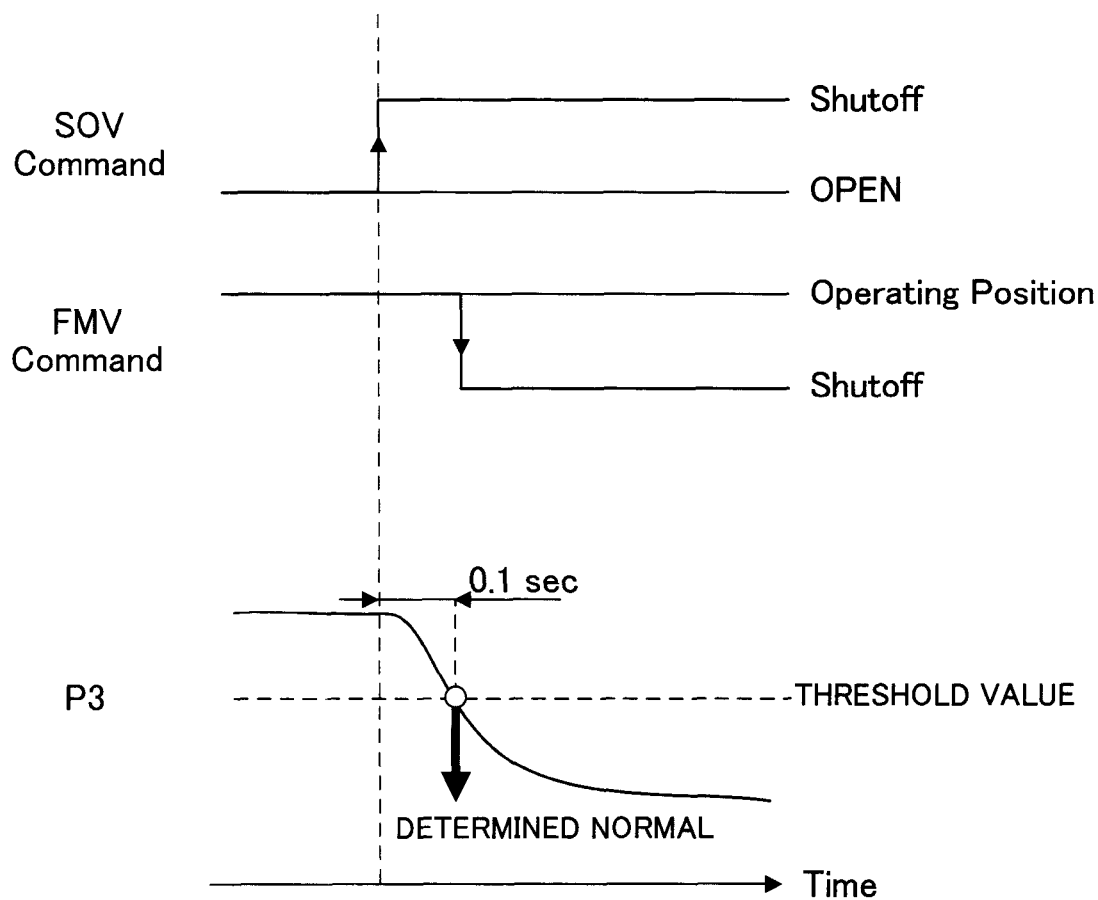
FIG. 4 is a time chart for explaining the processing of FIGS. 2 and 3.

FIG. 4 is a time chart for explaining the processing of the foregoing flowcharts.

When the shutoff command is outputted as the command (SOV command) for the fuel shutoff valve 38a, if the fuel shutoff valve 38a is normal, the outlet pressure P3 of the high-pressure compressor 24 is decreased in a short period of 0.1 second or thereabout, as illustrated.

This is because, when the fuel supply to the fuel nozzle 28 is shut off by the fuel shutoff valve 38a, it stops injection of combustion gas to the high-pressure turbine 40 and hence, the output of the high-pressure compressor 24 driven by the high-pressure turbine 40 is decreased promptly. Thus, based on the outlet pressure P3 of the high-pressure compressor 24 which is responsive to the shut-off of the fuel supply, it is possible to determine whether the fuel shutoff valve 38a is normal.

Aside from the above, when the fuel shutoff valve 38a is closed, hydraulic pressure of the fuel metering valve 32 is decreased in response thereto and the valve 32 is closed accordingly. It may be possible to consider conducting the failure detection of the fuel shutoff valve 38a based on the change in the output value of the opening sensor 32b of the fuel metering valve 32.

However, since the decrease in the hydraulic pressure of the fuel metering valve 32 in response to the fuel supply shut-off by the fuel shutoff valve 38a is less responsive compared to the decrease in the outlet pressure P3, it is not preferable to conduct the failure detection by the output value of the opening sensor 32b of the fuel metering valve 32.

It should be noted that the threshold value to be compared with the outlet pressure P3 is set to an appropriate value beforehand taking into account a balance between the time taken for failure determination and the accuracy of that.

Further, the reason why the shutoff command is outputted as the command (FMV command) for the fuel metering valve 32 after normality/abnormality determination of the fuel shutoff valve 38a has been made is to reliably and surely shut off the fuel supply by closing the fuel metering valve 32 through the torque motor 32a.

As stated above, this embodiment is configured to have an apparatus for and method of protecting overspeed of a gas turbine engine (10) having a combustion chamber (26), a turbine (specifically high-pressure turbine 40) rotated by combustion gas injected from the combustion chamber to drive a compressor (24), a fuel shutoff valve (38a) installed in a fuel supply line (38) of the engine to shut off fuel to be supplied to the combustion chamber and a controller (ECU 82) for controlling operation of the fuel shutoff valve based on a rotational speed (N2) of the turbine so as to protect the turbine from overspeed; comprising: a pressure sensor (P3 sensor 74) that detects pressure at an outlet of the compressor driven by the turbine; a comparator (ECU 82; S14, S100) that compares the detected outlet pressure with a threshold value when a command of shutting off supply of the fuel is outputted; and a failure determiner (ECU 82; S14, S102-S106) that determines whether a failure of the fuel shutoff valve occurs based on a comparison result.

Specifically, the failure determiner determines that a failure of the fuel shutoff valve (38a) has occurred when the detected outlet pressure is not less than the threshold value (S100-S106).

More specifically, the failure determiner determines that a failure of the fuel shutoff valve (38a) has occurred when the detected outlet pressure is not less than the threshold value if a predetermined time period (1 sec.) has passed since the command of shutting off supply of the fuel was outputted (S100-S106).

With this, it becomes possible to promptly detect a failure of the fuel shutoff valve 38a without additionally installing a sensor for the failure detection, thereby enhancing the reliability.

The apparatus and method further includes: a fuel metering valve (32) that is installed upstream of the fuel shutoff valve in the fuel supply line to regulate a flow rate of the fuel to be supplied to the combustion chamber; and a fuel metering valve opener/closer (torque motor 32a) that opens/closes the fuel metering valve, and the controller controls the fuel metering valve to close through the fuel metering valve opener/closer when the failure determination by the failure determiner has been completed (ECU 82, S14, S108). With this, it becomes possible to reliably and surely shut off the fuel supply to the combustion chamber 26. In the apparatus and method, the engine (10) is mounted on an aircraft and further including: a ground determiner (WOW sensor 80; ECU 82, S10) that determines whether the aircraft is on ground; and the failure determiner determines whether the failure of the fuel shutoff valve (38a) occurs when the aircraft is determined to be on the ground. With this, it becomes possible to reliably and surely shut off the fuel supply to the combustion chamber 26.

It should be noted that, although the two-shaft turbofan engine is taken as an example in the foregoing, the apparatus according to this invention can be applied to the turbojet engine, another type of turbofan engine, the turboprop engine and the turboshaft engine.

Japanese Patent Application No. 2009-192932 filed on Aug. 24, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for protecting overspeed of a gas turbine engine having a combustion chamber, a turbine rotated by combustion gas injected from the combustion chamber to drive a compressor, a fuel shutoff valve installed in a fuel supply line of the engine to shut off fuel to be supplied to the combustion chamber and a controller for controlling operation of the fuel shutoff valve based on a rotational speed of the turbine so as to protect the turbine from overspeed, comprising:

a pressure sensor that detects pressure at an outlet of the compressor driven by the turbine;

a comparator that compares the detected outlet pressure with a threshold value when a command from the controller to the fuel shutoff valve instructing the fuel shutoff valve to shut off supply of the fuel to the combustion chamber is outputted; and a failure determiner that determines a failure of the fuel shutoff valve has occurred when a comparison result of the comparator shows that the detected outlet pressure is equal to or greater than the threshold value continuously for longer than a predetermined time period, wherein the comparator and the failure determiner are configured to compare the detected outlet pressure with the threshold value and determine the failure of the fuel shutoff valve has occurred based on the comparison result only when the output of the command is detected, and wherein, when the failure determiner determines that the failure of the fuel shutoff valve has occurred, the controller sends a signal to shut off fuel supplied to the gas turbine engine.

2. The apparatus according to claim 1, further including:

a fuel metering valve that is installed upstream of the fuel shutoff valve in the fuel supply line to regulate a flow rate of the fuel to be supplied to the combustion chamber; and a fuel metering valve opener/closer that opens/closes the fuel metering valve, and the controller controls the fuel metering valve to close through the fuel metering valve opener/closer when the failure determination by the failure determiner has been completed.

3. The apparatus according to claim 1, wherein the engine is mounted on an aircraft and further including:

a ground determiner that determines whether the aircraft is on ground; and the failure determiner determines whether the failure of the fuel shutoff valve occurs only when the aircraft is determined to be on the ground.

4. The apparatus according to claim 1, wherein the predetermined time period is one second.

5. A method of protecting overspeed of a gas turbine engine having a combustion chamber, a turbine rotated by combustion gas injected from the combustion chamber to drive a compressor, a fuel shutoff valve installed in a fuel supply line of the engine to shut off fuel to be supplied to the combustion chamber and a controller for controlling operation of the fuel shutoff valve based on a rotational speed of the turbine so as to protect the turbine from overspeed, comprising steps of:

detecting a pressure at an outlet of the compressor driven by the turbine;

detecting an output of a command from the controller to the fuel shutoff valve instructing the fuel shutoff valve to shut off supply of the fuel to the combustion chamber;

when a command from the controller to the fuel shutoff valve instructing the fuel shutoff valve to shut off supply of the fuel to the combustion chamber is outputted, comparing the detected outlet pressure with a threshold value;

determining whether a failure of the fuel shutoff valve has occurred when a comparison result shows that the detected outlet pressure is equal to or greater than the threshold value continuously for longer than a predetermined time period;

sending a signal to shut off fuel supplied to the gas turbine engine when the failure of the fuel shutoff valve is determined to have occurred, wherein the steps of comparing the detected outlet pressure with the threshold value and determining whether the failure of the fuel shutoff valve occurs based on the comparison result are only performed when the output of the command is detected.

6. The method according to claim 5, wherein the engine further includes: a fuel metering valve that is installed upstream of the fuel shutoff valve in the fuel supply line to regulate a flow rate of the fuel to be supplied to the combustion chamber; and a fuel metering valve opener/closer that opens/closes the fuel metering valve, and the method further includes the step of:

controlling the fuel metering valve to close through the fuel metering valve opener/closer when the failure determination by the step of failure determining has been completed.

7. The method according to claim 5, wherein the engine is mounted on an aircraft and further including the step of:
   determining whether the aircraft is on ground; and
   performing the step of failure determining to determine whether the failure of the fuel shutoff valve occurs only when the aircraft is determined to be on the ground.

8. The apparatus according to claim 1, wherein the output of the command triggers:
   the comparator to compare the detected outlet pressure with the threshold value at the time following the output of the command from the controller to the fuel shutoff valve instructing the fuel shutoff valve to shut off supply of the fuel to the combustion chamber; and
   the failure determiner to determine a failure of the fuel shutoff valve has occurred when a comparison result by the comparator shows that the detected outlet pressure is equal to or greater than the threshold value continuously for longer than a predetermined time period.

9. The method according to claim 5, wherein the predetermined time period is one second.

\* \* \* \* \*